United States Patent
Petti (12)

(10) Patent No.: US 6,343,434 B1
(45) Date of Patent: Feb. 5, 2002

(54) PEST-ACTIVATED BAIT DISPENSING SYSTEM

(76) Inventor: John Michael Petti, 3030 Castleton Dr., Apt. D, Bradenton, FL (US) 34208

( * ) Notice: Subject to any disclaimer, the term of this patent is extended or adjusted under 35 U.S.C. 154(b) by 0 days.

(21) Appl. No.: 09/505,398

(22) Filed: Feb. 16, 2000

Related U.S. Application Data

(60) Provisional application No. 60/120,172, filed on Feb. 16, 1999.

(51) Int. Cl.$^7$ .............................. A01M 1/20; A01M 1/02
(52) U.S. Cl. .............................. 43/131; 43/121; 239/55
(58) Field of Search .................... 43/107, 121, 131, 43/132.1, 136, 114, 116, 117; 239/34–6, 55

(56) References Cited

U.S. PATENT DOCUMENTS

| | | | | |
|---|---|---|---|---|
| 761,195 A | * | 5/1904 | Bosshard ..................... | 43/131 |
| 1,259,911 A | * | 3/1918 | Seibert ........................ | 43/131 |
| 3,032,915 A | | 5/1962 | Giroud-Abel | |
| 3,624,198 A | | 11/1971 | Arbaugh | |
| 3,835,578 A | | 9/1974 | Basile | |
| 3,906,656 A | | 9/1975 | Burke et al. | |
| 3,940,875 A | | 3/1976 | Basile | |
| 3,996,348 A | * | 12/1976 | Greenberg .................. | 424/409 |
| 4,563,836 A | * | 1/1986 | Woodruff et al. ............ | 43/131 |
| 4,793,474 A | * | 12/1988 | Drake ......................... | 206/0.5 |
| 4,804,142 A | * | 2/1989 | Riley .......................... | 239/56 |
| 4,841,669 A | * | 6/1989 | Demarest et al. ............ | 43/131 |
| 4,874,611 A | | 10/1989 | Wilson et al. | |
| 4,891,218 A | | 1/1990 | Sherman | |
| 5,119,586 A | * | 6/1992 | Townsend ................... | 43/114 |
| 5,548,922 A | * | 8/1996 | Wefler ........................ | 43/131 |
| 5,771,628 A | * | 6/1998 | Nobbs ........................ | 43/121 |
| 5,778,596 A | | 7/1998 | Henderson et al. | |
| 5,966,863 A | * | 10/1999 | Payton et al. ................ | 43/131 |
| 5,983,558 A | * | 11/1999 | Las et al. .................... | 43/131 |
| 6,058,646 A | * | 5/2000 | Bishoff et al. ............... | 43/131 |
| 6,109,537 A | * | 8/2000 | Heath .......................... | 239/6 |
| 6,195,934 B1 | * | 3/2001 | Megargle et al. ............ | 43/131 |

FOREIGN PATENT DOCUMENTS

| | | |
|---|---|---|
| FR | 2032164 | 11/1970 |
| JP | 59-34835 | 2/1984 |

* cited by examiner

Primary Examiner—Peter M. Poon
Assistant Examiner—Son T. Nguyen

(57) ABSTRACT

A system of poisonous bait presentation that preserves and prolongs the original characteristics of a deployed point source bait supply until such time as targeted pests expose a portion of the bait. The aggregate bait supply is distributed among separate compartments positioned proximately within a bait container produced from a deformable material that is resistant to reaction with the intended bait content and degradation from exposure to the environment once deployed. Palatability of the material may be enhanced by the inclusion of a feeding stimulant and/or attractant throughout it or in or on portions of it, thereby encouraging targeted pests to investigate it and, through piercing or mastication, eventually breach and make available for consumption one or more compartments of the preserved bait.

14 Claims, 3 Drawing Sheets

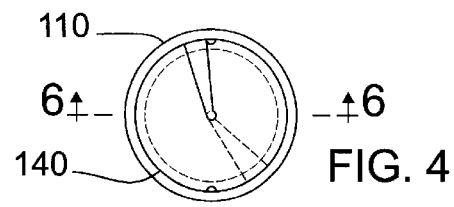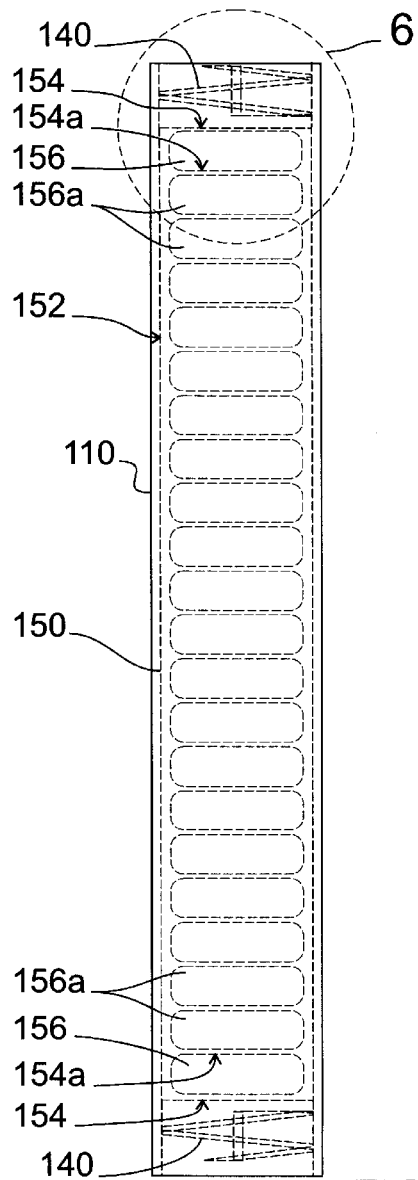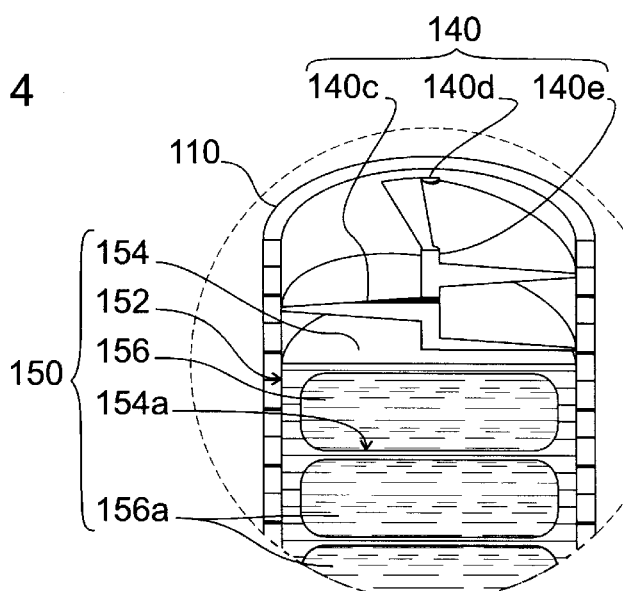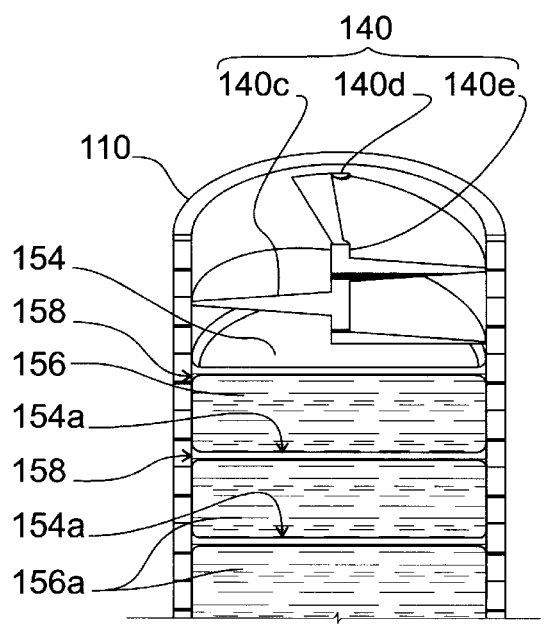

PEST-ACTIVATED BAIT DISPENSING SYSTEM

CROSS-REFERENCE TO RELATED APPLICATIONS

This application claims the benefit of U.S. Provisional Application Ser. No. 60/120,172, filed Feb. 16, 1999.

STATEMENT REGARDING FEDERALLY SPONSORED RESEARCH OR DEVELOPMENT

Not Applicable.

BACKGROUND OF THE INVENTION

1. Field of the Invention

The present invention relates generally to the field of devices for holding poisonous material, adapted to attract and kill vermin, particularly insects. More particularly, the invention relates to a practical, safe, and maintenance free system for preserving the integrity of a deployed point source bait supply until such time as a portion of the bait supply is exposed through the activity of targeted pests and thereby made available for consumption.

2. Description of the Prior Art

Formulation is the processing of a technical grade pesticidal compound by any method that will improve its properties of storage, handling, application, effectiveness, or safety. A low level of pesticide incorporated into one or more materials including food that is relished by the targeted pest is considered to be a bait formulation. Baits are typically manufactured in solid, semisolid, or liquid form and, with the exception of powdered or particulate baits which are typically broadcast over large areas, most baits are intended for point source deployment at selected locations where targeted pests are likely to encounter them and exposure to nontarget organisms is minimized. Baits are typically deployed in a manner that facilitates targeted pests with instant access to them, thereby exposing one or more components of the bait to degradation from environmental influences. Consequentially, baits deployed as a preventive measure and the remainder of baits deployed to combat active infestations become increasingly less effective over time and may serve as a food supply for the target pest or other pests if not removed when the pesticide becomes ineffective.

The art is aware of rodenticide baits that have been contrived to include a means for protecting the bait from environmental degradation until breached by the targeted pest. Examples are disclosed in L'Institut Pasteur, FR. Pat. No. 2,032,164, Giroud-Abel, U.S. Pat. No. 3,032,915, Arbaugh, U.S. Pat. No. 3,624,198, Burke et al., U.S. Pat. No. 3,906,656, and Sherman, U.S. Pat. No. 4,891,218; however, these examples are not concerned with dispensing liquid bait and do not target insects.

Wilson et al, U.S. Pat. No. 4,874,611 discloses a microencapsulated ant bait having a poisoned liquid core and a water resistant polymeric shell which is impervious to the core material. The shell material includes attractants which induce the ants to carry the bait particles back to nest where the microcapsule is penetrated and the core material is ingested. As with other particulate baits, this product is specifically intended for broadcast deployment.

The art is generally aware of numerous insect bait stations comprised of a central bait area surrounded by a housing and passageways of various configurations and complexities intended to induce or at least permit the ingress and egress of sufficiently small pests while obstructing access by larger organisms. A number of these devices have been contrived specifically to dispense liquid bait. While these devices do provide protection to nontarget organisms, they lack the means to protect the contained bait supply from environmental degradation because they provide targeted insects with instant access to the liquid bait.

Insects have different dietary requirements at different stages of development so an optimum bait deployment system should be capable of simultaneously accommodating a variety of baits containing protein, lipid, or carbohydrate food types. Ants are a major urban pest and because foraging adult ants most easily assimilate liquid food and supply nourishment to non-foraging nest mates, an optimum bait deployment system should be capable of accommodating liquid, solid, or semisolid baits. Urban pest control strategies that are changing from monthly to annual or semiannual treatment schedules and incorporating more point source bait supplies into their insect treatment plans need products that can be deployed as a preventive measure and remain effective for extensive periods. Different pest types such as ants or roaches vary greatly in physical size, population density, and behavior as do different species of the same pest type. Therefore, the basic design of an optimum bait deployment system should be sufficiently versatile to facilitate the use of various materials and scaling of its overall size and capacity to accommodate particular targeted pests. A need exists in the art for a bait dispensing system that incorporates all of the desirable characteristics listed above.

BRIEF SUMMARY OF THE INVENTION

An important object of the present invention is to provide a point source bait presentation system that can be deployed as a preventive measure and remain effective over an extended time period. More specifically, the aim of the invention is to exploit the inquisitive, resourceful, and destructive behavior of pests by encouraging them to explore and breach a penetrable protective bait container, thereby exposing preserved bait and making it available for consumption. Further, the protective bait container material is enhanced by the addition of an attractant or feeding stimulant to promote its exploration. Still further, the bait container is manufactured to include a plurality of discrete compartments for holding portions of the aggregate bait supply separately, thereby limiting environmental exposure of bait to breached compartments.

Another object is to maximize consumption of exposed bait by promoting sequential exposure of bait compartments. This is accomplished by an impenetrable housing that limits access to specific areas of the bait container, thereby motivating pests to consume the content of one compartment before breaching the wall of an adjoining compartment.

Another object is to prevent children and pets from being poisoned by exposed bait. This is accomplished by obstructing direct access to the bait container with topographic features incorporated into the impenetrable housing that create a maze-like path which targeted pest can easily navigate to reach the bait container.

A further object of the invention is to provide for its deployment at a variety of locations both indoors and outdoors at, below, and above ground level to control crawling, burrowing, and flying insects having mandibulate or piercing mouthparts. It will become obvious from the drawings that the shape, volume, and configuration of bait compartments can be changed and scaled along with the impenetrable housing to suit a particular application without straying from the inventive concept.

Yet another object is to facilitate provisioning a single device with different baits for pests, such as ants, with changing dietary requirements and preferences. Protein, carbohydrate, or lipid based baits in solid, semisolid, or liquid form may be added separately to compartments in a single bait container to facilitate the simultaneous presentation of a variety of baits and formulations.

Still another object of the invention is to make it easy to use by nonprofessionals. No maintenance is required between deployment and disposal of the device and bait levels can be easily monitored visually through the impenetrable housing which is at least in part transparent.

BRIEF DESCRIPTION OF THE SEVERAL VIEWS OF THE DRAWINGS

FIG. 4 is a plan view of a second embodiment of the invention.

FIG. 5 is an elevation view of the second embodiment of the invention shown in FIG. 4.

FIG. 6 is a partial sectional view, as indicated in FIG. 5, of the second embodiment of the invention taken along section line 6—6 of FIG. 4, shown in perspective.

FIG. 7 depicts an alternative method of producing the second embodiment of the invention in a view comparable to that of FIG. 6.

DETAILED DESCRIPTION OF THE INVENTION

Figure 1:
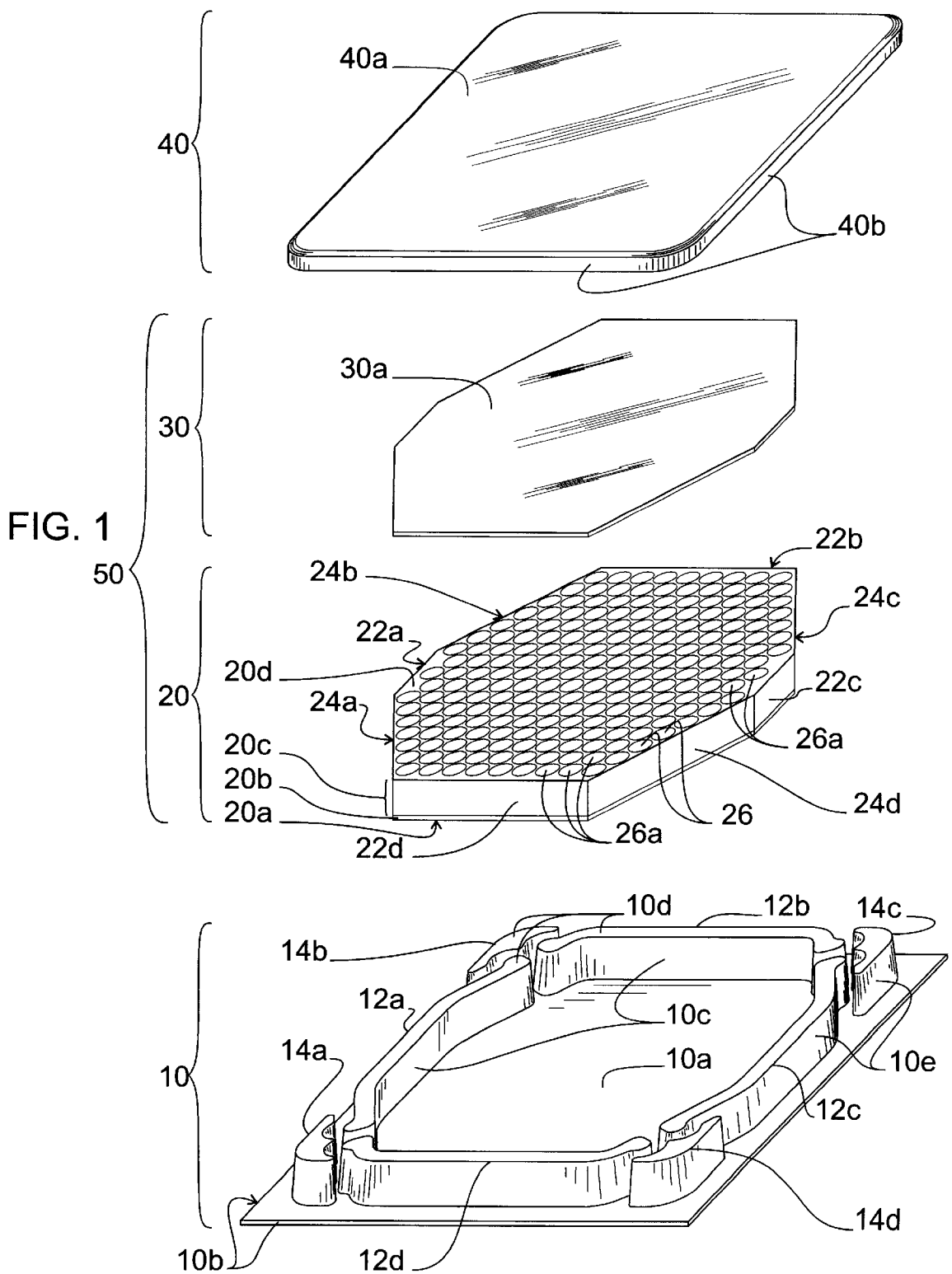
FIG. 1 is an exploded perspective view of the preferred embodiment of the invention.
Figure 2:
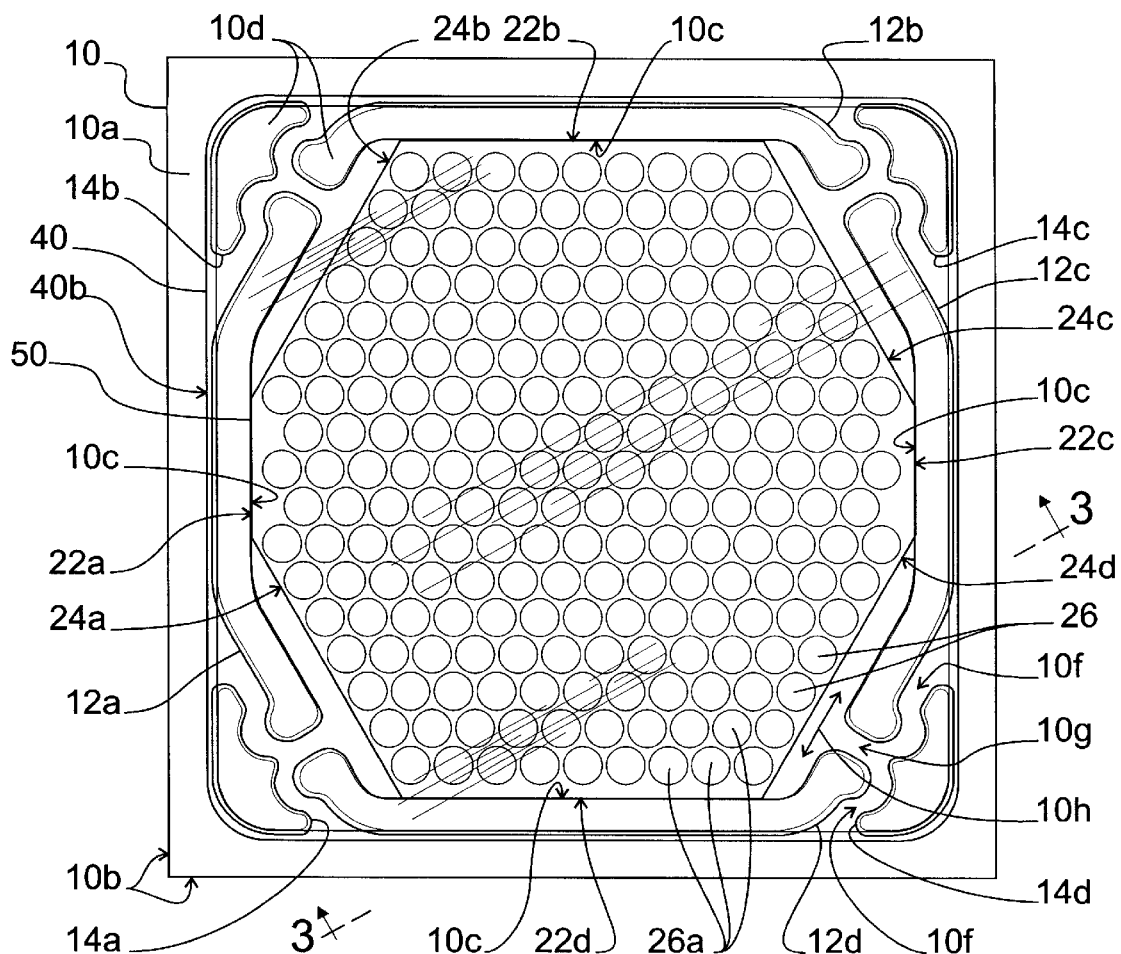
FIG. 2 is a plan view of the assembled preferred embodiment of FIG. 1.
Figure 3:
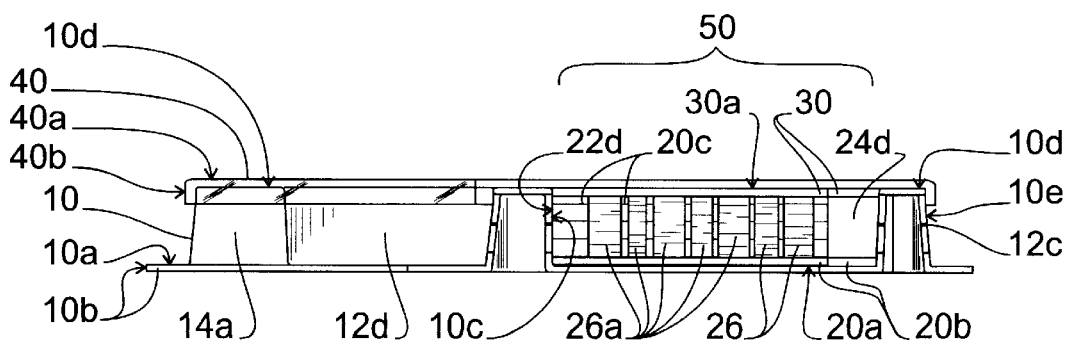
FIG. 3 is an elevation view of the assembled preferred embodiment partially sectioned along section line 3—3 of FIG. 2.

Two functionally equivalent embodiments of the invention, a preferred in FIGS. 1–3 and a second in FIGS. 4–7, are presented to demonstrate its potential versatility. Reference numbers appearing in this detailed description of the drawings conform to those found in the drawings. Like reference numbers are used to identify like components on subsequent figures. Lower case letters following a reference number are used to identify subcomponents or features that are functionally similar but differ slightly in structure and/or location.

As shown by the exploded perspective view of the preferred embodiment of the invention in FIG. 1, the liquid dispensing bait station includes three main components; base 10, cover 40, and bait container 50. Base 10 features a floor 10a, walls 12a–d that generally conform to the shape of main body 20, and barricades 14a–d that obstruct direct access to the interior area of base 10. Surfaces 10d of walls 12a–d and barricades 14a–d provide support and areas of attachment for transparent cover 40. Transparent cover 40 has a rim 40b that fits securely against the outer surfaces 10e of walls 12a–d and barricades 14a–d. Rim 40b provides additional points of attachment to base 10 as well as further obstructing access to the interior area of base 10. Bait container 50 includes an upper seal 30 and a main body 20, featuring an orderly arrangement of entryway compartments 26 adjacent to surfaces 24a–d and other interior compartments 26a, all manufactured in close proximity. Depending on the method of producing main body 20, an optional lower seal 20b (shown) may be required to close off the bottom surface of the midsection 20c of assembled bait container 50. Upper seal 30 is bonded to the upper surface 20d of main body 20 subsequent to filling, thereby isolating compartments 26 and 26a from each other and atmospheric influences.

FIG. 2 is a plan view of the first and preferred embodiment of the assembled invention showing features identified in FIG. 1 as they would appear when seen through transparent cover 40. Referring to the lower right corner of FIG. 2, distal outboard surfaces of walls 12c and 12d and inboard surface of barricade 14d define the lateral boundaries of access paths 10f, which are curved to guide pests to entrance 10g and into foraging area 10h. A gap between distal interior surfaces 10c of walls 12c and 12d and surface 24d of bait container 50 define the lateral boundaries of foraging area 10h. A similar arrangement is repeated at other corners so that a total of four entrances 10g and foraging areas 10h are provided. A tight fit between bait container 50 and base 10 interior surfaces 10c reduces atmospheric exposure of and prohibits pest access to side surfaces 22a–d of bait container 50. Initial access to bait is thereby restricted to side surfaces 24a–d of bait container 50. The contours of barricades 14a–d and their position in relation to walls 12a–d obstruct direct access to bait container 50 and thereby function to preclude premature rupture of entryway compartments 26 and interior compartments 26a from probing by nontarget organisms.

FIG. 3 depicts the assembled liquid dispensing bait station of FIG. 2 in elevation view partially sectioned along line 3—3 of FIG. 2. Transparent cover 40 is shown bonded to the upper surfaces 10d and outboard lateral surfaces 10e of barricade 14a and walls 12c and 12d along the bottom of surface 40a and interior surfaces of rim 40b, respectively. Walls 12c and 12d are shown arising from base 10 floor 10a. Assembled bait container 50 is shown appressed to floor 10a at surface 20a of optional lower seal 20b, the inner surface 10c of wall 12d at surface 22d, and the bottom of surface 40a of cover 40 at surface 30a of upper seal 30. Access to bait container 50 is thus prohibited from above and below by transparent cover 40 and floor 10a of base 10, respectively.

Base 10 may be of any suitable material; however, is preferably molded from heat deformable sheet plastic side by side with other bases 10, thus facilitating simultaneous manufacture, assembly, and packaging of multiple units fixed in an array. Perforations or scoring should be added between bases 10 to allow for easy separation of individual units along base 10 side surfaces 10b. The overall size of base 10 and the relative spacing between walls 12a–d and barricades 14a–d should be varied and adjusted to conform to and accommodate or exclude specific pests or groups of pests and intended deployment locations.

Main body 20 is produced from any suitable material such as, for example, paraffin wax that is pliable through mastication, piercing, or probing by targeted pests, yet resistant to reaction with the intended bait content and degradation from exposure to the environment once deployed. An attractant or feeding stimulant such as powdered sugar may be combined with the material of main body 20, portions of it, or portions of its surfaces, such as 24a–d, to encourage targeted pests to feed on or damage those areas, thereby exposing the bait-filled compartments within. An arrangement of compartments 26 and 26a are formed throughout the main body 20 either by machining, molding, or stamping so that they are in close proximity and do not penetrate the bottom surface 20a of main body 20. The final shape, volume, number, and arrangement of compartments can and should be tailored to conform to physical and, behavioral characteristics of the specific targeted pests or groups of pests. Optionally as shown in FIGS. 1 and 3, the main body 20 may be constructed from two separate parts; midsection 20c may be cut from an extrusion and closed off with lower seal 20b made of a similar material. Compartments should be arranged and separated by a wall that is sufficiently thin to permit easy access to adjoining compartments without compromising the structural integrity of bait container 50. Bait, if not already a contrasting color, should be dyed or colored as with blue food coloring before filling main body 20 compartments 26 and 26a with it. Compartments 26 and 26a are then hermetically sealed and isolated with upper seal 30, also made of a similar material. Seals 20b and 30 need not be impregnated with an attractant or feeding stimulant and may be bonded to midsection 20c with heat. Upper seal 30 should be sufficiently thin to facilitate the transmission of enough light through it to distinguish full and empty compartments 26 and 26a. The final lateral size and contour of bait container 50 should equal that of surfaces 10c of walls 12a–d except at its side surfaces 24a–d where, following insertion of bait container 50 into base 10, an open foraging area 10h would result. The boundaries of the foraging area should be varied and adjusted to conform to and accommodate or exclude specific pests or groups of pests. Thickness of the wall between surfaces 24a–d and entryway compartments 26 should be minimized to permit easy access to bait compartments without compromising the structural integrity or the bait preserving characteristics of bait container 50.

Cover 40 is preferably molded or formed of rigid transparent plastic to facilitate visual inspection of bait consumption from bait container 50. Inside dimensions of cover 40 should closely conform to the shape and size of upper 10d and outer 10e surfaces of walls 12a–d and barricades 14a–d as seen in FIGS. 2 and 3. Following insertion of bait container 50 into base 10, cover 40 is permanently affixed to base 10 by adhesive or other suitable means. Floor 10a and the lower edge of rim 40b define the lower and upper boundaries, respectively, of the entrances to access paths 10f. The height of rim 40b should be varied and adjusted to conform to and accommodate or exclude specific pests or groups of pests.

In general, the preferred embodiment of the liquid dispensing bait station described above is placed on or affixed to either horizontal or vertical surfaces in proximity to areas where targeted pests are likely to encounter it. Upon discovery, pests are encouraged by the structure and arrangement of walls 12a–d and barricades 14a–d to enter one of four foraging areas 10h. Initially, pests are encouraged by the presence of a feeding stimulant or attractant to feed on or pierce one of surfaces 24a–d and penetrate an entryway compartment 26, exposing its bait content. Subsequent to the exposure of an entryway compartment 26, pests arriving later are additionally encouraged by residue from exposed bait to penetrate adjoining entryway compartments 26 and interior compartments 26a. Other compartments remain intact offering preserved bait to other pests that arrive months later. The transparent cover 40 and translucent quality of wax seal 30 allow for visual inspection of foraging activity acknowledged by the disappearance of bait that is preferably colored or dyed a contrasting color. When all or the majority of bait is consumed, the entire device may be discarded and replaced. Several devices, dependent upon the application and area to be covered, should be deployed.

An alternative and second embodiment of the invention is shown in plan and elevation views in FIGS. 4 and 5, respectively. FIG. 6 is a partial view of the second embodiment of the liquid dispensing bait station, as indicated by dashed circle 6 in FIG. 5, shown in perspective sectioned along line 6—6 of FIG. 4. Referring to FIGS. 4–6, three main components are identified; housing 110, bait container 150, and end plug 140. Housing 110 is a transparent cylinder with an inner diameter generally conforming to the outer diameter of bait container 150. Bait container 150 features a linear arrangement of bait filled compartments 156 and 156a, each manufactured in close proximity and completely isolated. End plug 140, of which two are required, resembles a short section of the threaded portion of a male screw. End plug 140 features a spiral ramp 140c with an outer diameter slightly larger than the inner diameter of housing 110, supported centrally by a small constant diameter cylindrical shaft 140e and peripherally by two semicircular shafts positioned one-hundred eighty degrees apart relative to the central shaft 140e. FIG. 6 demonstrates that access to entryway compartments 156 and interior compartments 156a from ends of bait container 150 is limited to organisms that are small enough to navigate the spiral tunnel created by the insertion of end plug 140 into housing 110. Access to bait through side surface 152 is prohibited by housing 110, which also provides protection from environmental influences to bait container 150.

Housing 110 may be of any suitable material; however, is preferably cut from rigid transparent plastic tubing to a length slightly longer than that of the desired bait container 150, thus accommodating the insertion of end plugs 140. End plug 140 may be of any suitable material; however, is preferably molded of rigid plastic by injection into a two-part mold split at peripheral support shafts 140d. The mold should accommodate production of a substantial length of stock from which numerous end plugs 140 could be cut. The outer diameter of end plug 140 should be slightly larger than the inner diameter of housing 110. Upon insertion, the forced fit would slightly deform end plug 140 causing it to resist twisting and removal, thereby reducing the risk of exposure of bait to nontarget organisms.

Bait container 150 is produced from any suitable material such as, for example, paraffin wax that is pliable through mastication, piercing, or probing by targeted pests, yet resistant to reaction with the intended bait content and degradation from exposure to the environment once deployed. An attractant or feeding stimulant such as powdered sugar may be combined with the material, portions of it, or portions of its surfaces such as 154, to encourage targeted pests to feed on or damage those areas, thereby exposing the bait-filled compartments within. Bait container 150 may be produced and filled simultaneously by extrusion through a multiport die. Intermittent injection of bait through the center of the multiport die during the constant injection of the bait container 150 material would produce a continuous cylindrically shaped extrusion supporting the bait filled compartments 156 and 156a. The outer diameter surface 152 of bait container 150 should approximate the inner diameter of housing 110 and facilitate its insertion into housing 110. The length of bait container 150, the volume of individual compartments 156 and 156a, and the thickness of dividing walls at surfaces 154 and 154a can and should be varied to conform to the physical and behavioral characteristics of specific targeted pests or groups of pests, as well as the intended placement of a device. By varying these parameters the device could take on an infinite number of sizes; however, a limited number of standard diameter bait containers 150 and end plugs 140 could be used with various standard lengths of corresponding standard diameter housings 110 to produce devices in a finite number of standard sizes.

In a view identical to that of FIG. 6, FIG. 7 depicts the result of an alternative method of producing the second embodiment of the device shown in FIGS. 4–6. Bait compartments 156 and 156a are produced inside housing 110 by alternating the injection of bait and a suitable protective material, such as paraffin wax, into housing 110. Bait compartments are isolated by a layer of the material which is sealed against housing 110 at surfaces 158.

In general, the second embodiment of the liquid dispensing bait station described above is placed on or affixed to either horizontal or vertical surfaces in proximity to areas where targeted pests are likely to encounter it. Owing to its shape and variety of possible sizes, it is ideally suited to inconspicuous placement in areas between carpeting and baseboards, in electrical outlet and switch boxes, and in wall voids where it might be suspended by a string or holder (not shown). Upon discovery and exploration, pests are encouraged by the structure of end caps 140 to enter housing 110 and initially encounter surface 154 of bait container 150. The presence of a feeding stimulant or attractant would induce the pests to feed on or pierce end surface 154 and eventually penetrate an entryway compartment 156, exposing its fresh bait content. Subsequent to the exposure of an entryway compartment 156, pests arriving later are additionally encouraged by residue from exposed bait to penetrate adjoining interior compartments 156a. Other interior compartments 156a remain intact offering preserved bait to other pests that arrive months later. The transparent housing 110 and translucent quality of wax bait container 150 allow for visual inspection of foraging activity acknowledged by the disappearance of bait that is preferably colored or dyed a contrasting color. When all or the majority of bait is consumed, the entire device may be discarded and replaced. Several devices, dependent upon the application and area to be covered, should be deployed.

The use of baits to present pesticide to targeted organisms is well known to those experienced in the field of pest control and has well-established residential, commercial, and agricultural value world-wide. A practical means of manufacture and use is described above for two embodiments of the invention which can be varied in proportions and size to accommodate both deployment at various locations under various conditions and a variety of pests. While there has been described preferred embodiments of the invention, it should be apparent to those skilled in the art that numerous alterations, omissions, and additions to their design can be made without departing from the spirit of the invention. While there has also been described practical means of manufacturing and using the preferred embodiments of the invention, it should be equally apparent to those skilled in the art that improvements in manufacturing techniques, the inclusion of additional uses, and alternative methods of deploying the invention may be realized and implemented, also without departing from the spirit of the invention.

For example, the protective housings and safety features may be less elaborate or not necessary in applications where exposure to nontarget organisms is not a consideration, such as deployment at subterranean, agricultural, or inaccessible locations. At an extreme, the invention could be manufactured and sold to qualified pest control technicians as a large slab or block which would then be divided and deployed as they see fit. While this would result in the loss of the important feature of sequential exposure of bait compartments, any decrease in efficiency may be offset by a lower cost of obtaining and deploying the invention in this manner.

The invention could also be sold as standard components without assembly to qualified pest control technicians, allowing the device to be configured for a specific application. This might include selecting a bait or combination of baits that they feel will work best and inserting the bait(s) into the bait container. This might also include tailoring the diameter and length of the second embodiment of the invention to fit a particular location.

A means of rupturing one or more bait compartments may be provided for applications or circumstances where the initial activation of the device at the time of deployment is prudent.

The bait container might be constructed of an opaque material if ease of manufacturing or improvements to its preserving or attractive qualities outweigh the benefit of visually monitoring the bait supply through a thin layer of translucent material, such as paraffin wax.

The generally flat arrangement of compartments in FIGS. 1–3 could be combined with the linear arrangement of compartments in FIGS. 4–7 to produce a bait container with adjoining layers, of numerous compartments.

The invention is also well suited to dispensing nonpoisonous nutritious food to pets and laboratory reared animals, such as insects, and could be deployed without safety features and possibly without the benefit of sequential exposure of compartments facilitated by inclusion of a protective housing.

A bait container resembling that of the first embodiment of the invention might also be formed around the bait in a single step. This may be accomplished in a number of ways depending on the proposed bait content. For example, liquid or semisolid baits could be injected into the liquid phase of the bait container material, as demonstrated for the second embodiment of the invention. The liquid phase of the bait container material could also be added to solid baits that are preformed and prearranged in accordance with the desired bait compartment size, shape, and distribution pattern, or vice-versa. This procedure could also be applied to liquid or semisolid baits if their phase is temporarily altered to the solid state or if they are supported by a porous or fibrous material, also preformed in accordance with the desired bait compartment size and shape.

What I claim is:

1. A multiple exposure pest-activated dispenser for presenting fresh bait to pests over extended periods, said dispenser comprising:

a. a quantity of bait;
  b. a container configured for holding said quantity of bait, said container constructed of a material that is non-reactive with said quantity of bait and the atmosphere, said container comprising a framework of exterior walls and interior walls adapted to fractionate said quantity of bait into a plurality of small bait portions and retain said bait portions in separate hermetically sealed compartments, said compartments being isolating from the atmosphere at non-adjoining surfaces by said exterior walls and from one another at adjoining surfaces by said interior walls, said bait portions thereby gaining additional protection from atmospheric degradation by the bait content of adjoining compartments;
  c. said material further being destructible by targeted pests and comprising an attractant known to promote exploration, feeding, and subsequent destruction of said container by targeted pests, thereby making said bait portions ready for consumption;

d. said exterior walls being generally uniform in thickness except at areas adjacent to entryway compartments where said exterior walls are thinner, said entryway compartments accounting for a minority number of total said compartments, and said interior walls being thin at least in part and in comparison to said exterior walls; and e. said bait portions being selected from a group consisting of liquid formulations, solid formulations, and semisolid formulations, said bait portions further formulated to contain food from a group consisting of proteins, lipids, and carbohydrates;

f. whereby when said container is oriented either vertically or horizontally, said bait portions are sealed within said compartments, targeted pests approach and randomly explore said container, the pests will likely first destruct a thinner one of said exterior walls adjoining one of said entryway compartments thereby exposing the one of said bait portions contained therein, consume said bait portion, advance through empty said entryway compartment to destruct a thin one of said interior walls of an adjoining one of said compartments, expose and consume said bait portion contained therein, and so on until targeted pests are satiated, leaving remaining ones of said bait portions protected from environmental degradation and intact for pests that arrive later.

2. The dispenser of claim 1 wherein said material of said container is to some degree transparent and said bait portions are a contrasting color whereby the quantity of said bait portions remaining can be detected.

3. The dispenser of claim 2 wherein said compartments are arranged in two dimensions resulting in said container being generally flat in shape and comprising a single layer of said compartments, said thinner exterior walls being located at surfaces of the ones of said compartments being entryway compartments that are perpendicular to the plane of said compartments.

4. The dispenser of claim 3 further comprising an indestructible protective housing, said protective housing comprising a cover and a base, said base further comprising a floor, a plurality of walls, and a plurality of barriers, said floor, said walls, said barriers, and said cover in combination defining a hollow interior and a plurality of access paths through which targeted pests can gain access to said hollow interior, said base and said cover being configured to enclose said container within said hollow interior in such a way that said access paths become aligned with said entryway compartments and provide the only means by which targeted pests can access said container, thereby assuring sequential exposure of said compartments and maximized consumption of said bait portions, said protective housing further isolating said container and said bait portions contained therein from atmospheric exposure, thereby increasing the useful life of said dispenser.

5. The dispenser of claim 4 wherein said protective housing is at least in part transparent, whereby the quantity of said bait portions remaining can be detected.

6. The dispenser of claim 4 wherein opposing ones of said walls and said barriers are configured in such a way that said access paths are non-linear, thereby reducing the risk of children probing and accidentally rupturing said compartments.

7. The dispenser of claim 2 wherein said compartments are arranged linearly resulting in said container being generally cylindrical in shape, said entryway compartments and said thinner exterior walls being located at each of the opposite ends of said container.

8. The dispenser of claim 7 further comprising an indestructible protective housing and two end plugs, said protective housing being tubular in shape and having an inner diameter equal to that of the outer diameter of said container, said end plugs comprising a spiral ramp connected to a central shaft, said protective housing and said end plugs being configured to enclose said container in such a way that said spiral ramps become aligned with said entryway compartments and provide the only means by which targeted insects can access said container, thereby assuring sequential exposure of said compartments and maximized consumption of said bait portions, said protective housing further isolating said container and said bait portions contained therein from atmospheric exposure, thereby increasing the useful life of said dispenser.

9. The dispenser of claim 8 wherein said protective housing is at least in part transparent, whereby the quantity of said bait portions remaining can be detected.

10. The dispenser of claim 8 wherein said spiral ramps are configured to prevent direct linear access to said container and have an outer diameter slightly larger than said inner diameter of said protective housing so that said end plugs become wedged when pushed into ends of said protective housing, thereby reducing the risk of children probing and accidentally rupturing said compartments.

11. The dispenser of claim 2 wherein said compartments are arranged in three dimensions resulting in said container being generally flat in shape and comprising at least two adjoining layers of said compartments, said thinner exterior walls being located at surfaces of the ones of said compartments being entryway compartments that are perpendicular to the plane of said compartments.

12. The dispenser of claim 11 further comprising an indestructible protective housing, said protective housing comprising a cover and a base, said base further comprising a floor, a plurality of walls, and a plurality of barriers, said floor, said walls, said barriers, and said cover in combination defining a hollow interior and a plurality of access paths through which targeted pests can gain access to said hollow interior, said base and said cover being configured to enclose said container within said hollow interior in such a way that said access paths become aligned with said entryway compartments and provide the only means by which targeted pests can access said container, thereby assuring sequential exposure of said compartments and maximized consumption of said bait portions, said protective housing further isolating said container and said bait portions contained therein from atmospheric exposure, thereby increasing the useful life of said dispenser.

13. The dispenser of claim 12 wherein said protective housing is at least in part transparent, whereby the quantity of said bait portions remaining can be detected.

14. The dispenser of claim 12 wherein opposing ones of said walls and said barriers are configured in such a way that said access paths are non-linear, thereby reducing the risk of children probing and accidentally rupturing said compartments.

* * * * *